US008706704B2

(12) United States Patent
Abrams et al.

(10) Patent No.: US 8,706,704 B2
(45) Date of Patent: Apr. 22, 2014

(54) METHOD AND SYSTEM FOR CREATING SEMANTIC RELATIONSHIPS USING HYPERLINKS

(75) Inventors: Steven R. Abrams, New City, NY (US); Bard Bloom, Yorktown Heights, NY (US); Paul T. Keyser, New York, NY (US); Douglas N. Kimelman, Winnipeg (CA); Eric M. Nelson, Durham, NC (US); Tova Roth, Woodmere, NY (US); Ian Simmonds, Dobbs Ferry, NY (US); Steven Tang, San Jose, CA (US); John M. Vlissides, Clifton, VA (US); Dru Ann Vlissides, legal representative, Clifton, VA (US); Wendy D. Neuberger, Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 685 days.

(21) Appl. No.: 11/775,913

(22) Filed: Jul. 11, 2007

(65) Prior Publication Data
US 2009/0018988 A1 Jan. 15, 2009

(51) Int. Cl.
*G06F 17/30* (2006.01)
(52) U.S. Cl.
USPC .......................... 707/694; 707/736; 707/794
(58) Field of Classification Search
USPC ............ 707/2, 10, 101, 102, 104, 1, E17.005, 707/104.1, 713, 694, 736, 794
See application file for complete search history.

(56) References Cited

U.S. PATENT DOCUMENTS

| | | | |
|---|---|---|---|
| 5,247,661 A * | 9/1993 | Hager et al. | 707/104.1 |
| 5,708,825 A * | 1/1998 | Sotomayor | 715/205 |
| 6,154,213 A * | 11/2000 | Rennison et al. | 715/854 |
| 6,457,028 B1 * | 9/2002 | Pitkow et al. | 715/206 |
| 6,510,458 B1 | 1/2003 | Berstis et al. | |
| 6,718,329 B1 * | 4/2004 | Selvin et al. | 707/10 |
| 2003/0217267 A1 | 11/2003 | Kindberg | |
| 2004/0068527 A1* | 4/2004 | Smith, III | 707/204 |
| 2005/0229167 A1 | 10/2005 | Henning et al. | |
| 2005/0235031 A1 | 10/2005 | Schneider et al. | |
| 2005/0259120 A1 | 11/2005 | Mansfield et al. | |
| 2006/0117262 A1* | 6/2006 | Nagayama | 715/734 |

OTHER PUBLICATIONS

Abrams, et al., "Architectural Thinking and Modeling with the Architects' Workbench", IBM Systems Journal, vol. 45, No. 3; pp. 481-500; 2006.

* cited by examiner

*Primary Examiner* — Shiow-Jy Fan
(74) *Attorney, Agent, or Firm* — Scully, Scott, Murphy & Presser, P.C.; Vazken Alexanian

(57) ABSTRACT

A method and system are disclosed for creating a hyperlink together with an associated semantic link between a source entity, and a target entity. The source entity includes descriptive text. The system includes means for selecting text within the source entity, and means for selecting the target entity. Also, means are provided for selecting a type of semantic link, and means are provided for creating a hyperlink between said selected text and said target entity. The system further includes means for creating a semantic link of said type between said source entity and said target entity, including means for including in the hyperlink a reference to said semantic link. In the preferred embodiment of the invention, the means for selecting the type of semantic link includes means for prompting a user to select from among a plurality of candidate types of semantic links.

15 Claims, 4 Drawing Sheets

METHOD AND SYSTEM FOR CREATING SEMANTIC RELATIONSHIPS USING HYPERLINKS

BACKGROUND OF THE INVENTION

1. Field of the Invention

This invention generally relates to the use of hyperlinks and semantic links, and more specifically, the invention relates to the combination of hyperlinks and semantic links to enable a user to navigate through semantically related structures over which computational analysis can be done.

2. Background Art

The Internet is a fast growing and important communication medium. One integral and familiar aspect of utilizing the Internet is an application called a "browser". This application, by reading hypertext and other related programming code and displaying corresponding text and graphics, allows virtually anyone interested in using the Internet to use this amazing tool easily and simply. One of the most used and familiar aspects of Internet browsers is the ability to click on a hyperlink in a hypertext environment and follow the link to additional hypertext.

A hyperlink is a connection between an element in a hypertext document, such as a word, a phrase, a symbol, or an image, and a different element in the document, another document, a file or a script. The user activates the link by clicking on the linked element, which is usually underlined or in a color different from the rest of the document to indicate that the element is linked. Without hyperlinks, the Internet could not be utilized by users with the ease, simplicity and speed that it is today. Hyperlinks are an inextricable part of the Internet browsing experience, and will be for the foreseeable future.

Hyperlinking, more generally, is a common technique for connecting documents in networked systems. Hyperlinks help users navigate rich content by making a connection between a source document element (e.g. a word, a phrase, or portion of an image) and a target document—and even to a specific location within the target document. The user traverses that connection through simple user gesture (such as a mouse click), easily navigating to the target. While many systems have been built over the past several decades of information systems research and development, none have taken hold as dramatically as the World Wide Web.

In these systems, the links serve navigational purposes only. Links often imply the existence of some kind of relationship between the source and target entity that the user will discover upon reading the text, looking at the picture, or navigating the link. However, there is no computer analyzable representation of the semantics of the relationship. It is simply a navigational link.

As an example, a web page about one of the inventors might state: "I work for IBM." IBM could be a hyperlink to www.ibm.com, and a human reader will know that IBM is a company that employs the inventor. An important purpose is served—it is easy for the human reader to quickly move from a document about the inventor to one about his employer. However, the hyperlink conveys no information about the nature of the relationship between IBM and the inventor. A computer would only be able to ascertain the kind of relationship between inventor and company through techniques such as natural language analysis, which can be expensive and error-prone.

There have been other kinds of information technology systems, which allow the explicit representation of semantic relationships among entities. Semantic Networks (often represented with technology such as OWL or RDF) are a prime example. These systems represent the kind of relationship between two entities. These systems consist of 'statements', which encode relationships among entities. A statement such as (employs company—IBM inventor—Abrams) encodes the employment relationship between IBM and the inventor. Such relationships may be logically stored in a table that lists the pairs of objects that are connected by a specified type of relation in a given direction, along with other attributes of that relationship.

While hyperlinks help humans to navigate documents, semantic relationships help computers do analysis over structures.

SUMMARY OF THE INVENTION

An object of this invention is to combine hyperlinks and semantic relationships to allow users the navigational ease of hyperlinks through semantically related structures over which computational analysis can be done.

Another object of the present invention is to use hyperlinks to make it easier to create semantic relationships among entities.

These and other objectives are attained with a method and system for creating a hyperlink together with an associated semantic link between a source entity, and a target entity. The source entity includes descriptive text. The system of the present invention includes means for selecting text within the source entity, and means for selecting the target entity. Also, means are provided for selecting a type of semantic link, and means are provided for creating a hyperlink between said selected text and said target entity. The system further includes means for creating a semantic link of said type between said source entity and said target entity, including means for including in the hyperlink a reference to said semantic link.

In the preferred embodiment of the invention, the means for selecting the type of semantic link includes means for selecting from among a defined set of candidate types of semantic links; and, for example, this selecting means may be or include means for prompting a user to select from among a plurality of candidate types of semantic links. In addition, in this preferred embodiment, the source entity has a source type and the target entity has a target type, and the means for selecting the type of semantic link further includes means for analyzing the source type and the target type, and means for determining said plurality of candidate types of semantic links based on said analyzing said source type and said target type. For example, the analyzing means may comprise means for querying a metamodel for the types of relationships that said metamodel specifies as permissible for relating said source type and said target type.

The preferred embodiment of the present invention, described below in detail, by combining hyperlinks and semantic links allows users the navigational ease of hyperlinks through semantically related structures over which computational analysis can be done. It also facilitates the maintenance of these structures, so that when semantic links are deleted, the corresponding hyperlinks can be dealt with appropriately as well.

Moreover, combining the two approaches would make it easier for humans to create the semantic links among entities by using the markup techniques common to hypertext systems in conjunction with techniques for categorizing and formalizing data.

Further benefits and advantages of this invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
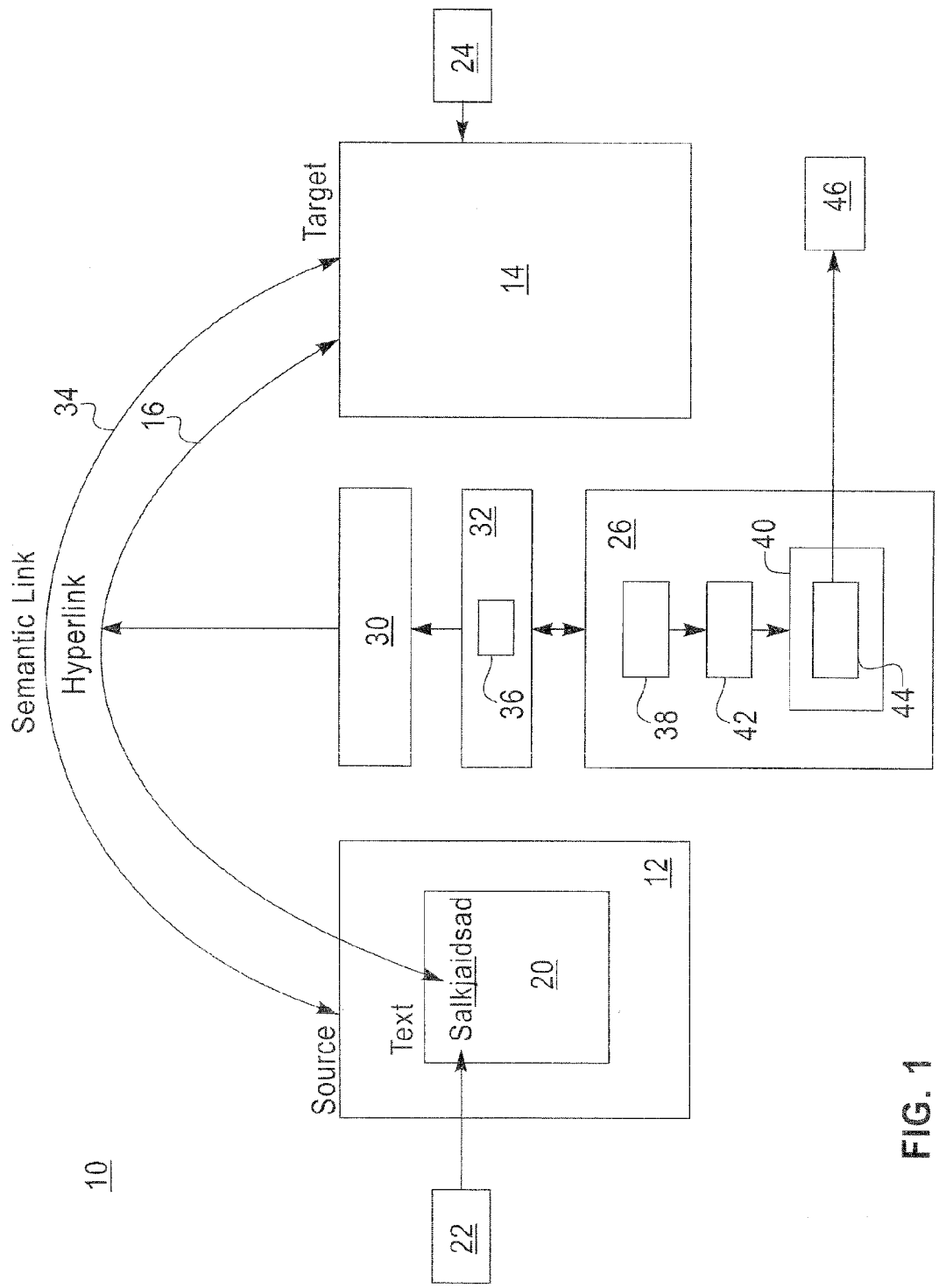
FIG. 1 is a block diagram illustrating the present invention.

The present invention provides a method and system for creating a hyperlink together with an associated semantic link between a source entity and a target entity. FIG. 1 shows, as an example, a system 10 according to a preferred embodiment of the present invention. In particular, FIG. 1 shows source entity 12, target entity 14, and hyperlink 16 between selected text in the source entity and the target entity. The source entity includes descriptive text 20. System 10 includes means 22 for selecting text within the source entity 12, and means 24 for selecting the target entity 14. Also, means 26 are provided for selecting a type of semantic link, and means 30 are provided for creating a hyperlink between said selected text and said target entity. System 10 further includes means 32 for creating a semantic link 34 of said type between said source entity 12 and said target entity 14, including means 36 for including in the hyperlink a reference to said semantic link.

In the preferred embodiment of the invention, the means 26 for selecting the type of semantic link includes means 38 for selecting from among a defined set of candidate types of semantic links; and, for example, this selecting means 38 may be or include means for prompting a user to select from among a plurality of candidate types of semantic links.

In addition, in this preferred embodiment, the source entity 12 has a source type and the target entity has a target type, and the means 26 for selecting the type of semantic link further includes means 40 for analyzing the source type and the target type, and means 42 for determining said plurality of candidate types of semantic links based on said analyzing said source type and said target type. For example, the analyzing means 40 may comprise means 44 for querying a metamodel 46 for the types of relationships that said metamodel specifies as permissible for relating said source type and said target type.

The links used in the practice of the present invention may be represented using standard Hypertext Markup Language (HTML). In the HTML specification, a hyperlink is represented by an "a-tag." The a-tag brackets the text, which serves as a hyperlink, and includes a URI, which is a reference to the linked entity. In a representative embodiment of this invention, such a system can be used for representing hyperlinks. In addition, within the a-tag, an identifier is specified which refers to an entity (for example, a computer file) describing semantic relationship. This identifier can be a URI or some other UID. The file includes an identifier representing the type of the relationship. In one embodiment, the file also includes the URI of the related entities, optionally specifying the directionality of the relationship. In another embodiment, the relationship is assumed to be between the entity containing the a-tag and the entity referred to by the URI within the a-tag.

Figure 2:
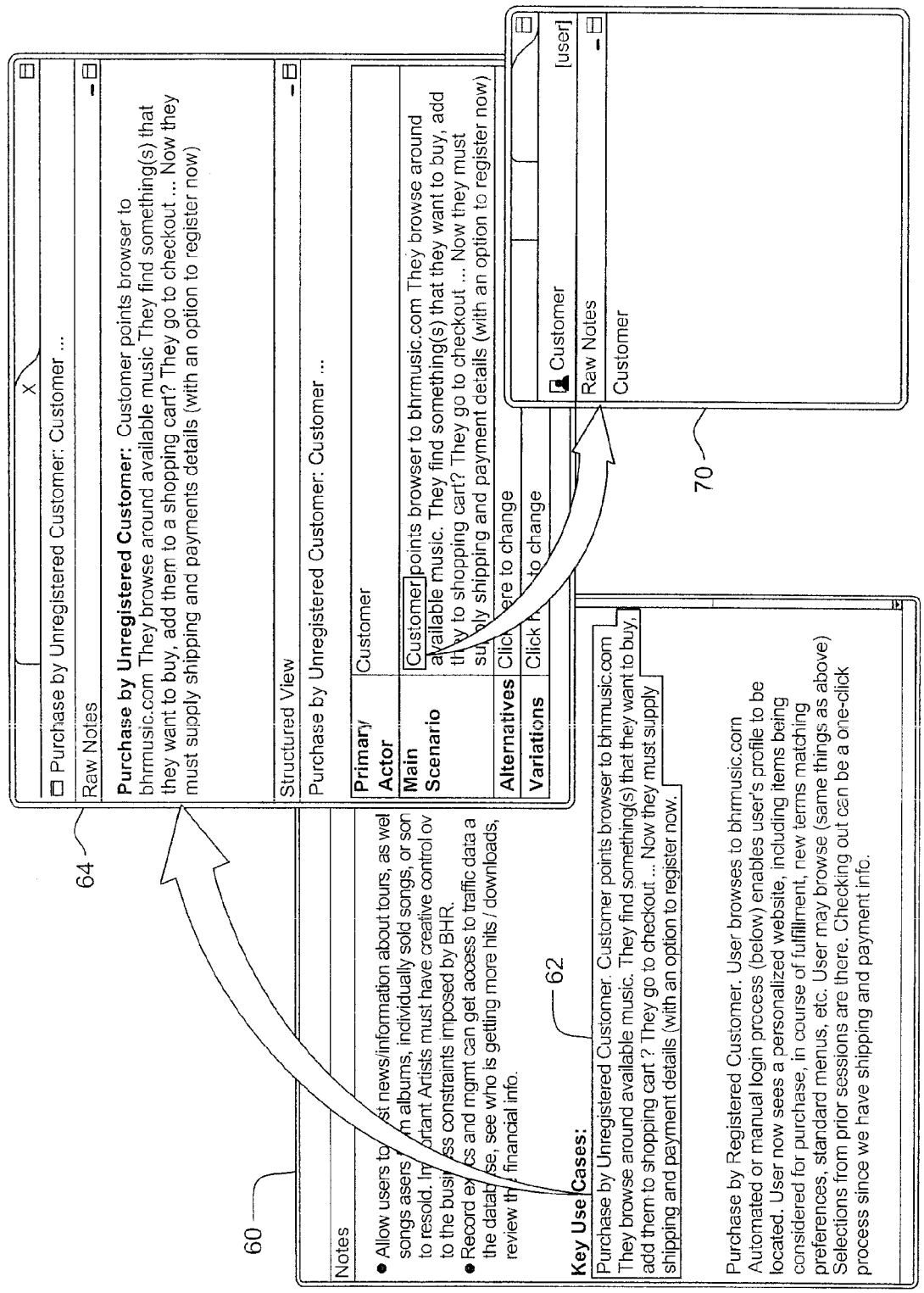
FIG. 2 shows an example of semantic hyperlinking according to a preferred embodiment of the present invention.

FIG. 2 illustrates an example of the present invention. The leftmost rectangle 60 in the figure shows notes that were taken by an architect in a meeting with a customer. Even though the architects were thinking in terms of Global Service Method and concepts such as use cases, it was nevertheless effective to first capture the discussion in meeting notes along with the varied information about servers, locations, processes, people to talk to, things to do, and other issues that came up. In reviewing the notes after the meeting, the architect noticed a large passage of text that related to a use case. The architect selected the relevant text 62, starting with "Purchase by Unregistered Customer," and created a use case model element 64 from the selected text (shown in the middle rectangle). When a large passage of text such as this is selected, an elided substring is used for the label of the created model element, and the entire text is copied into the "Raw Notes" field of the new model element. In this way, a large passage of text is quickly inserted into a model element, without concern for its structure. (Structuring typically takes place later.) In this case, after looking at the new use case, the architect cut and pasted the bulk of it into the "Main Scenario" field of the use case, where it would later be refined for inclusion in the use-case work product. Noticing that the scenario mentioned a kind of actor, the architect selected the word "Customer" and created a new actor model element (shown in the rightmost rectangle 70). The system of this invention consulted the metamodel, found that 'Actors' can be related to use cases with the "Involves" relationship, and automatically created this relationship and associated it with the hyperlink.

Figure 3:
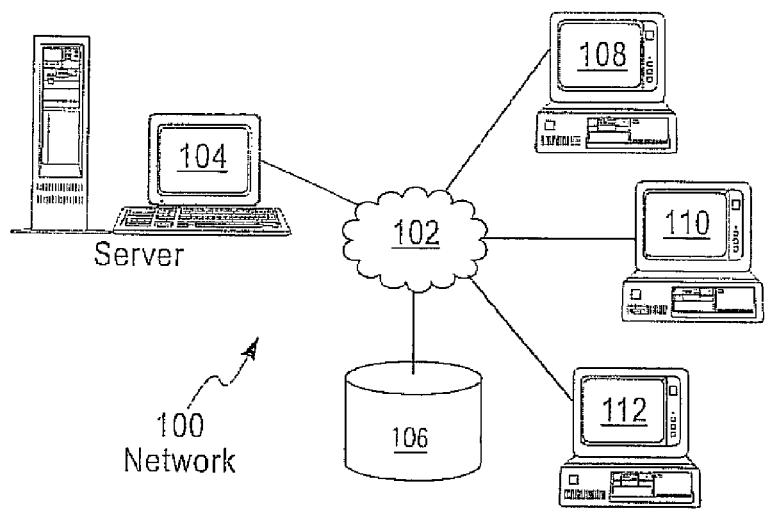
FIG. 3 is a pictorial representation of a distributed data processing system in which the present invention may be implemented.

FIG. 3 is a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, server 104 is connected to network 102, along with storage unit 106. In addition, clients 108, 110 and 112 are also connected to network 102. These clients 108, 110 and 112 may be, for example, personal computers or network computers. For purposes of this application, a network computer is any computer coupled to a network, which receives a program or other application from another computer coupled to the network. In the depicted example, server 104 provides data, such as boot files, operating system images, and applications, to clients 108, 110 and 112. Clients 108, 110 and 112 are clients to server 104. Distributed data processing system 100 may include additional servers, clients, and other devices not shown. In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks, such as, for example, an intranet, a local area network (LAN), or a wide area network (WAN). FIG. 3 is intended as an example and not as an architectural limitation for the present invention.

Figure 4:
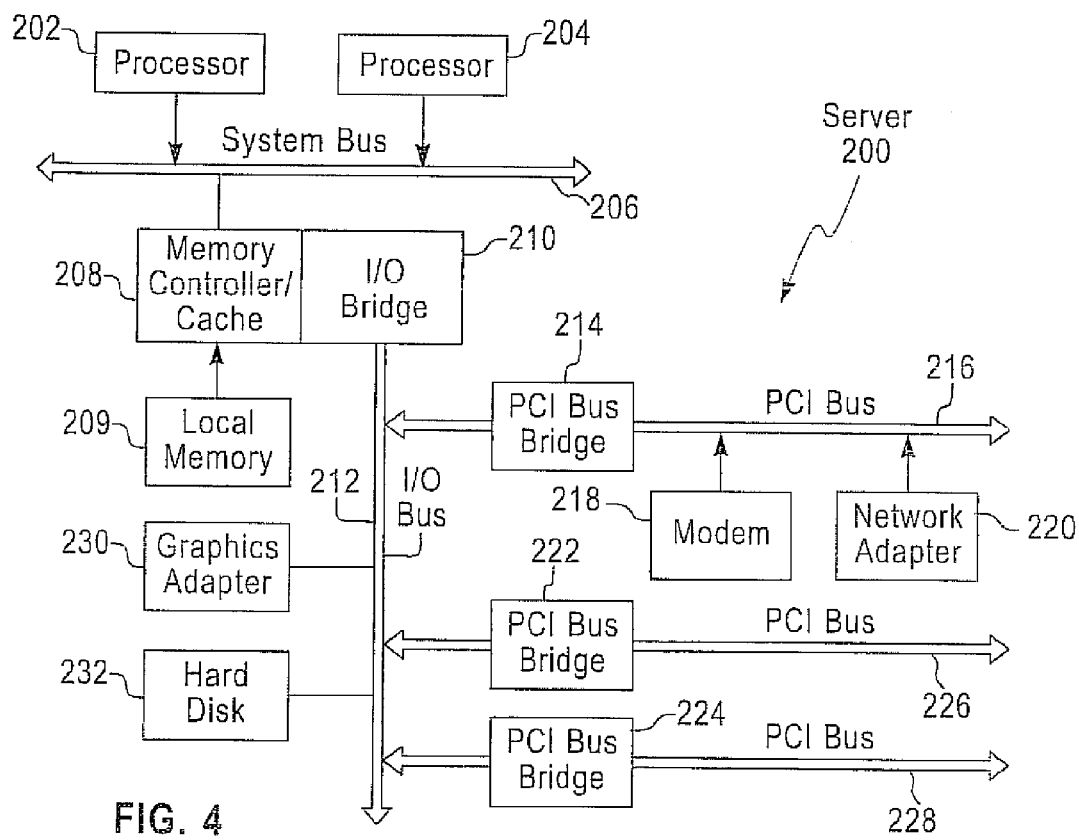
FIG. 4 is a block diagram depicting a data processing system that may be implemented as a server in accordance with the present invention.

Referring to FIG. 4, a block diagram depicts a data processing system that may be implemented as a server, such as server 104 in FIG. 3, in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218-220 may be connected to PCI bus 216. Typical PCI bus implementations support four PCI expansion slots or add-in connectors. Communications links to network computers 108-112 in FIG. 3 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 4 may vary. For example, other peripheral devices, such as optical disk drives and the like, also may be used in addition or in place of the hardware depicted. The depicted example is not meant to imply architectural limitations with respect to the present invention.

The data processing system depicted in FIG. 4 may be, for example, an IBM RISC/System 6000, a product of International Business Machines Corporation in Armonk, N.Y., running the Advanced Interactive Executive (AIX) operating system.

Figure 5:
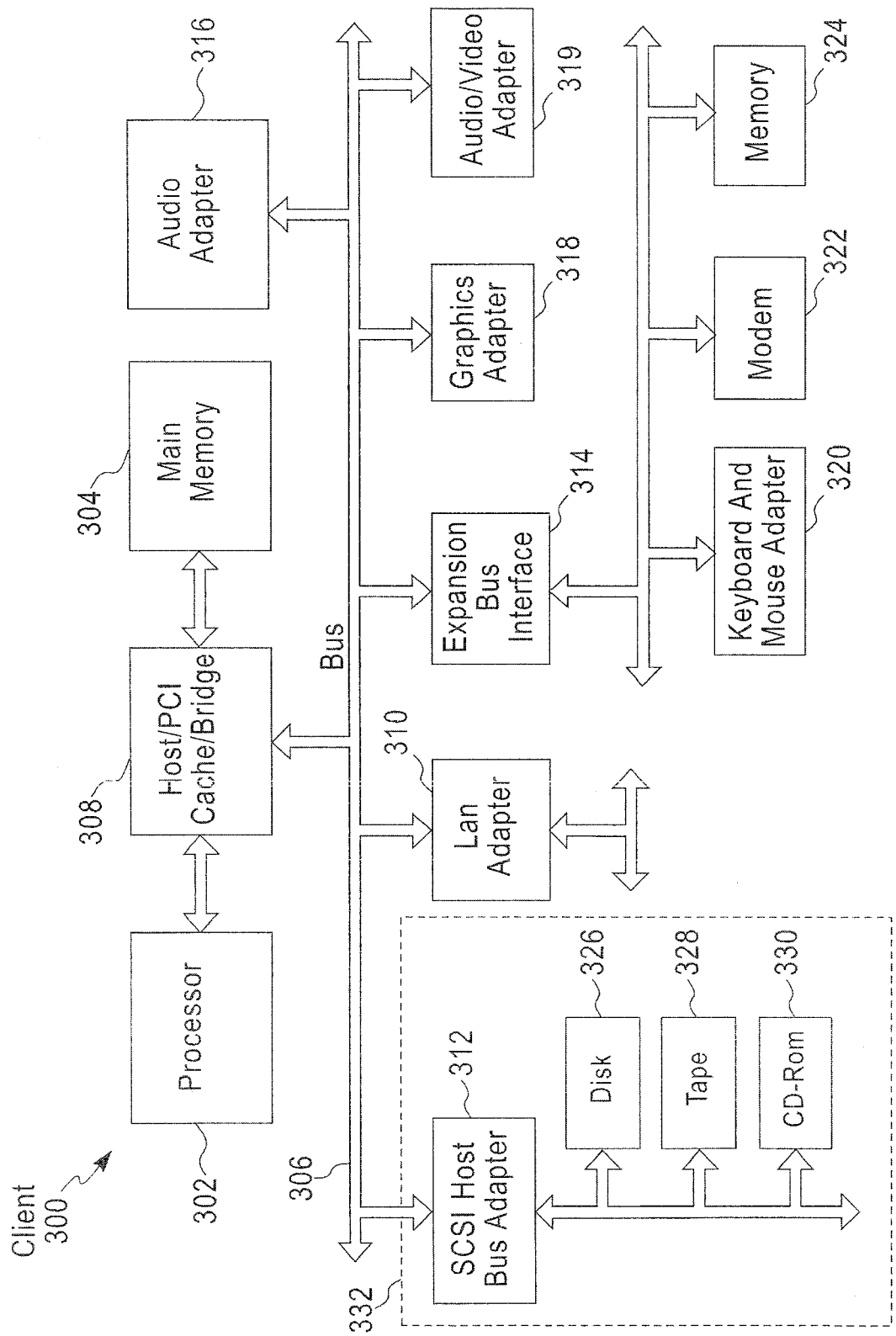
FIG. 5 is a block diagram illustrating a data processing system that may be implemented as a client in accordance with the present invention.

With reference now to FIG. 5, a block diagram illustrates a data processing system that may be implemented as a client, such as client 108 in FIG. 3, in accordance with the present invention. Data processing system 300 is an example of a client computer. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 5. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 5 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 5, denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM, and/or flash ROM in order to provide non-volatile memory for storing operating system files and/or user-generated data.

The depicted example in FIG. 5 and above-described examples are not meant to imply architectural limitations.

The preferred embodiment of this invention provides a number of significant advantages. For instance, by combining hyperlinks and semantic relationships, the invention allows users the navigational ease of hyperlinks through semantically related structures over which computational analysis can be done. It also facilitates the maintenance of these structures, so that when semantic relationships are deleted, the corresponding hyperlinks can be dealt with appropriately as well.

Moreover, combining the two approaches would make it easier for humans to create the semantic relationships among entities by using the markup techniques common to hypertext systems in conjunction with techniques for categorizing and formalizing data.

As will be readily apparent to those skilled in the art, the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The present invention, or aspects of the invention, can also be embodied in a computer program product or a program storage device, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objectives stated above, it will be appreciated that numerous modifications and embodiments may be devised by those skilled in the art, and it is intended that the appended claims cover all such modifications and embodiments as fall within the true spirit and scope of the present invention.

What is claimed is:

1. A computer system for creating a hyperlink together with an associated semantic link between selected text in a first, source document and related text in a second, target document, said source document including descriptive text, the computer system comprising:
   a computer processor; and
   a memory coupled to the computer processor having instructions stored therein which, when executed by the computer processor, causes the computer processor to perform the operations comprising:
   selecting text within the source document;
   selecting said target document;
   creating a hyperlink to navigate over the Internet from said selected text in the source document to said target document, wherein said hyperlink includes a URI identifying the target document;
   selecting a type of semantic link; and
   creating a semantic link of said type between said selected text in the source document and said target document to identify a specified semantic relationship between said selected text and said target-document, and including in said hyperlink a reference, different from said URI, for identifying said semantic relationship to facilitate using the hyperlink to identify and navigate to documents semantically related to said selected text; and wherein:
   the selecting said target document includes refining the selected text from the source document to form refined selected text, and putting the refined selected text into the target document;
   the hyperlink points from the selected text in the source document to the refined selected text in the target document;
   the source document has a source type and the target document has a target type; and
   the selecting the type of semantic link includes
   analyzing said source type and said target type,
   determining a plurality of candidate types of semantic links based on said analyzing said source type and said target type, and
   prompting a user to select from among the plurality of candidate types of semantic links, including selecting a word from the selected text, identifying a category for the word, consulting a metamodel to determine a type of relationship between the identified category and the selected text, and using the type of relationship determined from consulting the metamodel as the type of the semantic link between the selected text in the source document and the target document.

2. The system according to claim 1, wherein said hyperlink and said semantic link are created at the same time.

3. The system according to claim 1, wherein said hyperlink and said semantic link are created at the same time as a single action in response to a defined user action.

4. The system according to claim 1, wherein said reference to said semantic link describes a specific type of relationship in a given direction.

5. A method of creating a hyperlink together with an associated semantic link between selected text in a first, source document and related text in a second, target document, said source document including descriptive text, the method comprising the steps of:
   selecting text within the source document;
   selecting said target document;
   creating a hyperlink to navigate over the Internet from said selected text in the source document to said target document, wherein said hyperlink includes a URI identifying the target document; selecting a type of semantic link; and
   creating a semantic link of said type between said selected text in the source document and said target document to identify a specified semantic relationship between said selected text and said target entity, and including in said hyperlink a reference, different from said URI, for identifying said semantic relationship to facilitate using the hyperlink to identify and navigate to documents semantically related to said selected text; and
   using one or more processing units, executing a hyperlink program and a semantic link program, to perform the creating the hyperlink and the creating the semantic link; and wherein:
   the selecting said target document includes refining the selected text from the source document to form refined selected text, and putting the refined selected text into the target document;
   the hyperlink points from the selected text in the source document to the refined selected text in the target document;
   the source document has a source type and the target document has a target type; and
   the selecting the type of semantic link includes
   analyzing said source type and said target type,
   determining a plurality of candidate types of semantic links based on said analyzing said source type and said target type, and
   prompting a user to select from among the plurality of candidate types of semantic links, including selecting a word from the selected text, identifying a category for the word, consulting a metamodel to determine a type of relationship between the identified category and the selected text, and using the type of relationship determined from consulting the metamodel as the type of the semantic link between the selected text in the source document and the target document.

6. The method according to claim 5, wherein said hyperlink and said semantic link are created at the same time.

7. The method according to claim 5, comprising the further step of copying said selected text into a model element.

8. The method according to claim 5, wherein said reference to said semantic link describe a specific type of relationship in a given direction.

9. The method according to claim 5, wherein:
the reference for identifying said semantic relationship includes a URI identifying a computer file, separate from the target document, describing semantic relationships;
said computer file includes URIs of the source and target documents and an identifier representing the semantic relationship between said selected text and said target document and specifies a directionality of the semantic relationship between the source and target documents.

10. A non-transitory program storage device readable by machine, tangibly embodying a program of instructions executable by the machine to perform method steps for creating a hyperlink together with an associated semantic link between selected text in a first, source document and related text in a second, target document, said source document including descriptive text, said method steps comprising:
selecting text within the source document;
selecting said target document;
creating a hyperlink to navigate over the Internet from said selected text in the source document to said target document, wherein said hyperlink includes a URI identifying the target document; and
selecting a type of semantic link; and
creating a semantic link of said type between said selected text in the source document and said target document to identify a specified semantic relationship between said selected text and said target document, and including in said hyperlink a reference, different from said URI, for identifying said semantic relationship to facilitate using the hyperlink to identify and navigate to documents semantically related to said selected text; and wherein:
the selecting said target document includes refining the selected text from the source document to form refined selected text, and putting the refined selected text into the target document;
the hyperlink points from the selected text in the source document to the refined selected text in the target document;
the source document has a source type and the target document has a target type; and
the selecting the type of semantic link includes
analyzing said source type and said target type,
determining a plurality of candidate types of semantic links based on said analyzing said source type and said target type, and
prompting a user to select from among the plurality of candidate types of semantic links, including selecting a word from the selected text, identifying a category for the word, consulting a metamodel to determine a type of relationship between the identified category and the selected text, and using the type of relationship determined from consulting the metamodel as the type of the semantic link between the selected text in the source document and the target document.

11. The program storage device according to claim 10, wherein said hyperlink and said semantic link are created at the same time as a single action in response to a defined user action.

12. The program storage device according to claim 10, wherein the reference to said semantic link comprises an identifier of said semantic link.

13. A method of deploying a computer program product for creating a hyperlink together with an associated semantic link between selected text in a first, source document and related text in a second, target document, said source document including descriptive text, wherein when executed, said computer program performs the steps of:
selecting text within the source document;
selecting said target document;
creating a hyperlink to navigate over the Internet from said selected text selected text in to said target document, wherein said hyperlink includes a URI identifying the target document; and selecting a type of semantic link; and
creating a semantic link of said type between said selected text selected text in and said target document to identify a specified semantic relationship between said selected text and said target entity, and including in said hyperlink a reference, different from said URI, for identifying said semantic link to facilitate using the hyperlink to identify and navigate to documents semantically related to said selected text; and wherein:
the selecting said target document includes refining the selected text from the source document to form refined selected text, and putting the refined selected text into the target document;
the hyperlink points from the selected text in the source document to the refined selected text in the target document;
the source document has a source type and the target document has a target type; and
the selecting the type of semantic link includes
analyzing said source type and said target type,
determining a plurality of candidate types of semantic links based on said analyzing said source type and said target type, and
prompting a user to select from among the plurality of candidate types of semantic links, including selecting a word from the selected text, identifying a category for the word, consulting a metamodel to determine a type of relationship between the identified category and the selected text, and using the type of relationship determined from consulting the metamodel as the type of the semantic link between the selected text in the source document and the target document.

14. The method according to claim 13, wherein said hyperlink and said semantic link are created at the same time as a single action in response to a defined user action.

15. The method according to claim 13, wherein the reference to said semantic link comprises an identifier of said semantic link.

* * * * *